United States Patent
Goodridge et al.

(10) Patent No.: US 11,797,664 B2
(45) Date of Patent: *Oct. 24, 2023

(54) COMPUTER DEVICE AND METHOD FOR CONTROLLING PROCESS COMPONENTS

(71) Applicant: Avecto Limited, Manchester (GB)

(72) Inventors: John Goodridge, Manchester (GB); Thomas Couser, Manchester (GB); James William Maude, Manchester (GB)

(73) Assignee: Avecto Limited, Manchester (GB)

( * ) Notice: Subject to any disclaimer, the term of this patent is extended or adjusted under 35 U.S.C. 154(b) by 396 days.

This patent is subject to a terminal disclaimer.

(21) Appl. No.: 17/184,158

(22) Filed: Feb. 24, 2021

(65) Prior Publication Data

US 2021/0182380 A1 Jun. 17, 2021

Related U.S. Application Data

(63) Continuation of application No. 16/124,477, filed on Sep. 7, 2018, now Pat. No. 10,963,557.

(30) Foreign Application Priority Data

Sep. 8, 2017 (GB) ........................... 1714489
May 22, 2018 (GB) ........................... 1808380

(51) Int. Cl.
*G06F 9/445* (2018.01)
*G06F 21/53* (2013.01)
(Continued)

(52) U.S. Cl.
CPC .............. *G06F 21/51* (2013.01); *G06F 9/445* (2013.01); *G06F 9/44521* (2013.01);
(Continued)

(58) Field of Classification Search
CPC ...... G06F 21/51; G06F 9/44521; G06F 21/57; G06F 21/6281; G06F 21/31;
(Continued)

(56) References Cited

U.S. PATENT DOCUMENTS 5,881,225 A * 3/1999 Worth ................... G06F 21/629
726/17
5,991,542 A 11/1999 Han et al.
(Continued)

FOREIGN PATENT DOCUMENTS

EP 2750035 A1 7/2014
GB 2486528 B 9/2016
(Continued)

OTHER PUBLICATIONS

Chris Hoffman and Justin Pot; "How to Install Applications on a Mac: Everything You Need to Know"; HowToGeek.com website [full url in ref.]; Jul. 20, 2017 (Year: 2017).
(Continued)

*Primary Examiner* — Joseph P Hirl
*Assistant Examiner* — Aayush Aryal
(74) *Attorney, Agent, or Firm* — Morris, Manning & Martin, LLP; Daniel E. Sineway, Esq.; Adam J. Thompson, Esq.

(57) ABSTRACT

A computer device, including at least a processor and a memory, can be configured to control process components on a computer device. An agent can intercept a request to instantiate a new process component in a user account of a logged-in user. The request can originate on the computing device from an instance of a particular process component amongst a set of process components. The user account can be assigned default user privileges by a privilege access management service. The agent can determine whether to permit the intercepted request. The agent can permit the
(Continued)

intercepted request if the relationship is validated and if a trusted owner is identified amongst the set of identified owners.

20 Claims, 13 Drawing Sheets

(51) Int. Cl.
| | |
|---|---|
| *G06F 21/57* | (2013.01) |
| *G06F 21/51* | (2013.01) |
| *G06F 21/62* | (2013.01) |
| *H04L 9/40* | (2022.01) |
| *G06F 9/455* | (2018.01) |
| *G06F 21/31* | (2013.01) |

(52) U.S. Cl.
CPC ......... *G06F 9/45529* (2013.01); *G06F 21/53* (2013.01); *G06F 21/57* (2013.01); *G06F 21/6281* (2013.01); *H04L 63/102* (2013.01); *G06F 21/31* (2013.01); *G06F 2221/2103* (2013.01); *G06F 2221/2141* (2013.01)

(58) Field of Classification Search
CPC ..... G06F 2221/2103; G06F 2221/2141; G06F 9/445; G06F 9/45529; G06F 21/53; H04L 63/102
See application file for complete search history.

(56) References Cited

U.S. PATENT DOCUMENTS

| | | | |
|---|---|---|---|
| 6,233,618 B1 | 5/2001 | Shannon | |
| 7,133,904 B1 | 11/2006 | Soyha et al. | |
| 7,219,354 B1 | 5/2007 | Huang et al. | |
| 8,368,640 B2* | 2/2013 | Dardinski .............. | G05B 15/02 345/108 |
| 9,158,662 B1 | 10/2015 | Hanes et al. | |
| 9,712,576 B1* | 7/2017 | Gill .......................... | G06N 5/04 |
| 9,769,131 B1 | 9/2017 | Hartley | |
| 10,803,499 B1 | 10/2020 | Davis et al. | |
| 2002/0144137 A1 | 10/2002 | Harrah et al. | |
| 2002/0174256 A1 | 11/2002 | Bonilla et al. | |
| 2004/0210771 A1 | 10/2004 | Wood et al. | |
| 2005/0188370 A1 | 8/2005 | Kouznetsov et al. | |
| 2006/0089834 A1 | 4/2006 | Mowatt et al. | |
| 2007/0180502 A1 | 8/2007 | Yadav et al. | |
| 2007/0198933 A1 | 8/2007 | Van Der Bogert et al. | |
| 2008/0060051 A1 | 3/2008 | Lim | |
| 2008/0289026 A1 | 11/2008 | Abzarian et al. | |
| 2009/0070442 A1 | 3/2009 | Kacin et al. | |
| 2010/0274366 A1 | 10/2010 | Fata et al. | |
| 2011/0030045 A1 | 2/2011 | Beauregard et al. | |
| 2011/0173251 A1 | 7/2011 | Sandhu et al. | |
| 2011/0196842 A1 | 8/2011 | Timashev et al. | |
| 2011/0239288 A1 | 9/2011 | Cross et al. | |
| 2011/0251992 A1 | 10/2011 | Bethlehem | |
| 2012/0047259 A1 | 2/2012 | Krasser et al. | |
| 2012/0054744 A1 | 3/2012 | Singh et al. | |
| 2012/0066512 A1 | 3/2012 | Kass et al. | |
| 2012/0226742 A1 | 9/2012 | Mornchilov et al. | |
| 2013/0057561 A1 | 3/2013 | Nave et al. | |
| 2013/0339313 A1 | 12/2013 | Blaine et al. | |
| 2014/0279600 A1 | 9/2014 | Chait | |
| 2014/0281528 A1 | 9/2014 | Dubey et al. | |
| 2015/0040181 A1 | 2/2015 | Cook et al. | |
| 2015/0058839 A1 | 2/2015 | Madanapalli et al. | |
| 2015/0074828 A1 | 3/2015 | Beauregard et al. | |
| 2015/0128250 A1 | 5/2015 | Lee et al. | |
| 2016/0203313 A1 | 7/2016 | El-Moussa et al. | |
| 2016/0217159 A1* | 7/2016 | Dahan ..................... | G06F 16/21 |
| 2016/0378962 A1 | 12/2016 | Austin | |
| 2017/0011220 A1 | 1/2017 | Efremov et al. | |
| 2017/0048259 A1 | 2/2017 | Dodge et al. | |
| 2017/0054760 A1 | 2/2017 | Barton et al. | |
| 2017/0111368 A1 | 4/2017 | Hibbert et al. | |
| 2018/0024895 A1 | 1/2018 | Kumarasamy et al. | |
| 2018/0302409 A1 | 10/2018 | Hope | |
| 2019/0121631 A1 | 4/2019 | Hua et al. | |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman; "How to Disable System Integrity Protection on a Mac (and Why You Shouldn't)"; HowToGeek.com website [full url in ref.]; Jul. 5, 2017 (Year: 2017).
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB1808380.8.
Combined Examination & Search Report dated Mar. 6, 2019 for United Kingdom Patent Application No. GB1814798.3.
Combined Examination & Search Report dated Dec. 1, 2017 for United Kingdom Patent Application No. GB1708824.6.

* cited by examiner

Mozilla Firefox  Command window  MS Paint

COMPUTER DEVICE AND METHOD FOR CONTROLLING PROCESS COMPONENTS

CROSS-REFERENCE TO RELATED APPLICATIONS

This application is a continuation of U.S. patent application Ser. No. 16/124,477, filed Sep. 7, 2018, and entitled "COMPUTER DEVICE AND METHOD FOR CONTROLLING PROCESS COMPONENTS," which claims priority under 35 U.S.C. § 119 to Application No. GB 1808380.8 filed May 22, 2018, in the United Kingdom, and to Application No. GB 1714489.0 filed Sep. 8, 2017 in the United Kingdom, the entire disclosures of which are incorporated by reference herein.

BACKGROUND

Technical Field

The present invention relates generally to the field of computers and computer devices. More particularly, the present invention relates to a computer device and a method for controlling process components on the computer device.

Related Art

It is desirable to implement a least-privilege access security model, for example via privilege management, whereby each user account is granted only a minimal set of access privileges, appropriate for their role. Some forms of privilege management allow granting of temporary privileges to specific user accounts. For example, a user account of a specific user may be temporarily added to a privileged group, having elevated privileges. For a pre-set time period, the user account has all the privileges and access permissions assigned to that group. After that time period, the user account is removed from the group and the privileges for the user reverted.

Instances of process components, such as out-of-process components and in-process components, are typically assigned privileges upon instantiation, according to the respective user account. These privileges may be assigned directly via the user account or via inheritance to a child process component from a parent process component, for example. However, this may present a security vulnerability since malicious attackers may exploit these assigned privileges, including the minimum set of access privileges as well as the elevated privileges.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer device, a method and a computer-readable storage medium as set forth in the appended claims. Additional features of the invention will be apparent from the dependent claims, and the description herein.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In general, there is described an improved computer device and method for controlling process components on the computer device. Particularly, by intercepting requests to instantiate new process components in a user account of a logged-in user, wherein the requests originate from instance of particular process components amongst sets of process components and wherein the user account has assigned thereto default user privileges by the privilege access management service and determining whether to permit the intercepted requests including by: validating relationships between the new process components and the particular process components; and establishing sets of identified owners by identifying owners of the new process components, the particular process components and any parents thereof; the intercepted requests may be permitted if the relationships are validated and if trusted owners are identified amongst the sets of identified owners. Furthermore, identifiers are inserted into the instantiated new process components, thereby improving robustness of identifying the trusted owners, even if the process components directly having trusted owners have been terminated or if the requests originate only indirectly from the process components having the trusted owners. Particularly, if the process components directly having trusted owners have been terminated, the agent may otherwise deny the requests, as described below, rather than permit the requests. Further, if the requests originate only indirectly from processes having the trusted owners, the agent may also otherwise deny the requests, as described below, rather than permit the requests. In this way, instantiation of new process components may be better controlled, reducing security vulnerabilities that, for example, untrusted new process components may exploit by inheriting the default user privileges from the originating particular process components, while permitting instantiation of new process components that do originate from processes having trusted owners, including terminated processes having the trusted owners, or only indirectly from processes having the trusted owners. In this way, user convenience is improved while security is upheld.

In one example, there is described a computer device, including at least a processor and a memory, configured to control process components on the computer device, the computer device comprising: an operating system, a privilege access management service cooperating with the operating system and an agent; wherein the agent is configured to: intercept a request to instantiate a new process component in a user account of a logged-in user, wherein the request originates from an instance of a particular process component amongst a set of process components and wherein the user account has assigned thereto default user privileges by the privilege access management service; determine whether to permit the intercepted request including by: validating a relationship between the new process component and the particular process component; and establishing a set of identified owners by identifying owners of the new process component, the particular process component and any parents thereof; permit the intercepted request if the relationship is validated and if a trusted owner is identified amongst the set of identified owners; and insert an identifier into the instantiated new process component if the intercepted request is permitted.

In one example, the identifier comprises a unique identifier of the new process component.

In one example, the identifier comprises a unique identifier of a parent process component of the new process component.

In one example, the identifier is a token and wherein the agent is configured to insert the identifier into the instantiated new process component if the intercepted request is permitted by exchanging an existing token of the instantiated new process component with the identifier.

In one example, the agent is configured to store information related to the identifier in a set of identifier information and wherein the agent is configured to establish the set of identified owners by identifying owners of the new process component, the particular process component and any parents thereof by identifying the owners using the set of identifier information.

In one example, the agent is configured to delete the stored information related to the identifier from the set of identifier information if the instantiated new process component is terminated.

In one example, the agent is configured to intercept a request to instantiate a new in-process component comprising loading a shared library.

In one example, the agent is configured to intercept a request to instantiate a new out-of-process component comprising creating a new instance of an executable application.

In one example, the agent is configured to identify an identity of the particular process component from the intercepted request and/or an identity of the new process component from the intercepted request.

In one example, the agent is configured to validate the relationship between the new process component and the particular process component by consulting a plurality of rules stored on the computer device.

In one example, the plurality of rules includes mappings between trusted and/or untrusted process components.

In one example, the agent is configured to establish authorization from the user to permit the intercepted request and the agent is configured to permit the intercepted request if the authorization is established.

In one example, the agent is configured to provide a graphical user interface, GUI, dialog comprising at least one of a confirmation, a challenge-response, and a reason, and to receive a response therefrom.

In one example, the agent is configured to deny the intercepted request if the relationship is not validated and/or if the trusted owner is not identified amongst the set of identified owners.

In one example, the agent is configured to notify the user if the intercepted request is denied.

In one example, there is described a method of controlling process components on a computer device, the method being implemented by hardware of the computer device including at least a processor and a memory, the method comprising: intercepting, by an agent, a request to instantiate a new process component in a user account of a logged-in user, wherein the request originates from an instance of a particular process component amongst a set of process components and wherein the user account has assigned thereto default user privileges by a privilege access management service cooperating with an operating system of the computer device; determining, by the agent, whether to permit the intercepted request including: validating a relationship between the new process component and the particular process component; and establishing a set of identified owners by identifying owners of the new process component, the particular process component and any parents thereof; permitting, by the agent, the intercepted request if the relationship is validated and if a trusted owner is identified amongst the set of identified owners; and inserting, by the agent, an identifier into the instantiated new process component if the intercepted request is permitted.

In one example, the identifier comprises a unique identifier of the new process component.

In one example, the identifier comprises a unique identifier of a parent process component of the new process component.

In one example, the identifier is a token and wherein inserting, by the agent, the identifier into the instantiated new process component if the intercepted request is permitted comprises exchanging an existing token of the instantiated new process component with the identifier.

In one example, the method comprises storing information related to the identifier in a set of identifier information and wherein establishing the set of identified owners by identifying owners of the new process component, the particular process component and any parents thereof comprises identifying the owners using the set of identifier information.

In one example, the method comprises deleting the stored information related to the identifier from the set of identifier information if the instantiated new process component is terminated.

In one example, the intercepting the request comprises intercepting a request to instantiate a new in-process component comprising loading a shared library.

In one example, the intercepting the request comprises intercepting a request to instantiate a new out-of-process component comprising creating a new instance of an executable application.

In one example, the method comprises identifying an identity of the particular process component from the intercepted request and/or an identity of the new process component from the intercepted request.

In one example, the validating the relationship between the new process component and the particular process component comprises consulting a plurality of rules stored on the computer device.

In one example, the plurality of rules includes mappings between trusted and/or untrusted process components.

In one example, the determining whether to permit the intercepted request comprises establishing, by the agent, authorization from the user to permit the intercepted request and wherein permitting the intercepted request comprises permitting, by the agent, the intercepted request if the authorization is established.

In one example, the establishing authorization comprises providing a graphical user interface, GUI, dialog comprising at least one of a confirmation, a challenge-response, and a reason, and receiving a response therefrom.

In one example, the method comprises denying, by the agent, the intercepted request if the relationship is not validated and/or if the trusted owner is not identified amongst the set of identified owners.

In one example, the method comprises notifying the user, by the agent, if the intercepted request is denied.

In one example, there is provided a tangible non-transient computer-readable storage medium having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following examples provide an improved mechanism for controlling process components in a computer device and/or computer network. The example mechanism is simple and convenient for a user, and is lightweight to implement. Further, the example embodiments uphold security of computer devices while providing improved control of process components instantiated responsive to requests from parent process components. Many other advantages and improvements will be discussed in more detail herein.

Overview

Figure 1:
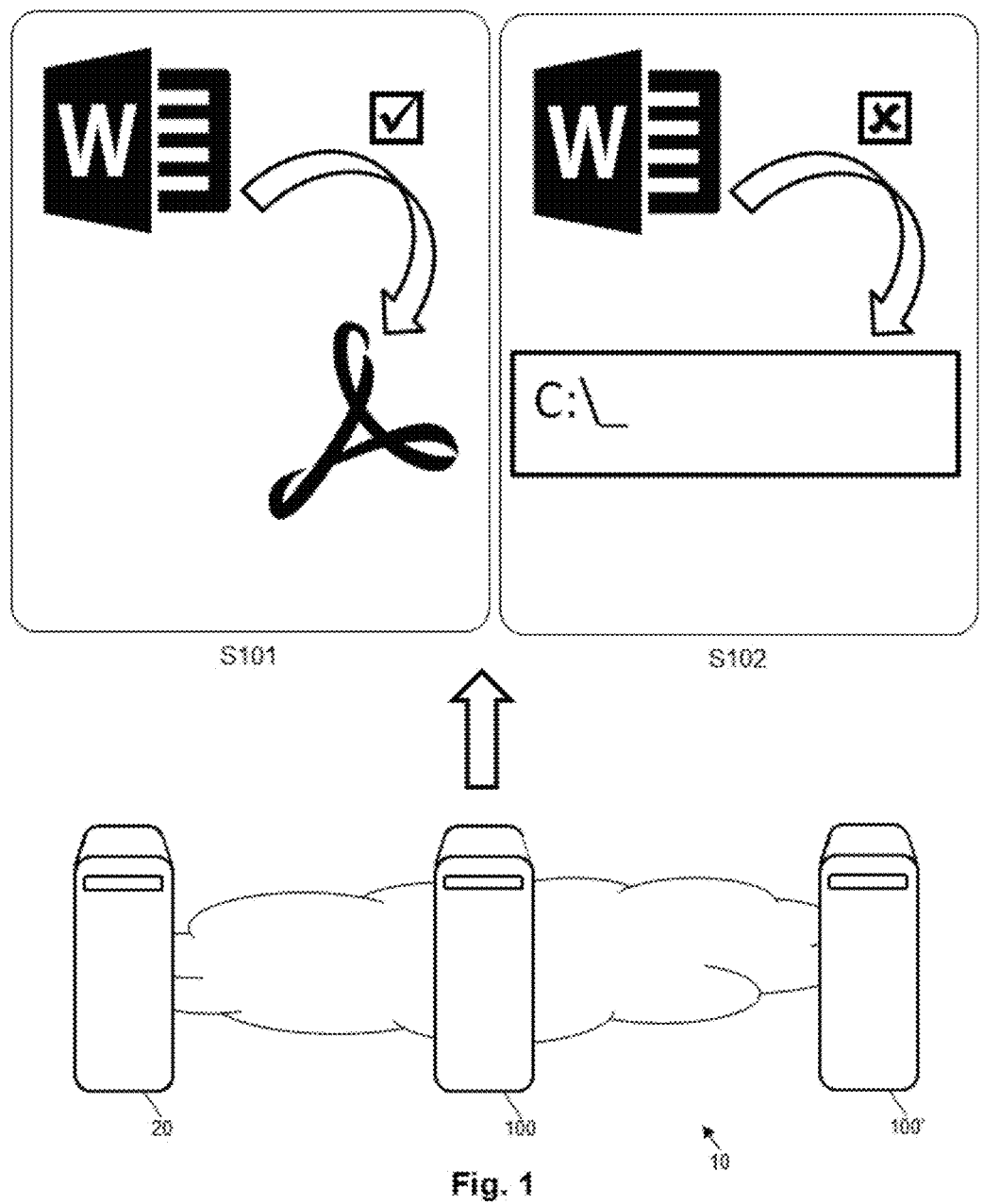
FIG. 1 is a schematic view of part of a network including an example computer device.

FIG. 1 is a schematic overview of part of a computer network 10 including an example computer device 100. Particularly, the computer device 100 is configured to control process components on the computer device 100. In this way, instantiation of new process components may be controlled, reducing security vulnerabilities that, for example, untrusted new process components may exploit by inheriting the default user privileges from the originating particular process components.

The computer device 100 comprises an operating system and a privilege access management service cooperating with the operating system, as described in more detail below with reference to FIG. 2. The computer device 100 also comprises an agent, as described in more detail below with reference to FIG. 2. The agent is configured to intercept a request to instantiate a new process component in a user account of a logged-in user, wherein the request originates from an instance of a particular process component amongst a set of process components and wherein the user account has assigned thereto default user privileges by the privilege access management service. Two examples, S101 and S102, are shown schematically. In the first example S101, the agent permits the intercepted request while in contrast, in the second example S102, the agent does not permit the intercepted request, as described below in more detail.

In the first example, as shown schematically at S101, the agent intercepts the request to instantiate Adobe Reader® in the user account of the logged-in user, in which the request originates from an instance of Microsoft Word. The agent is configured to determine whether to permit the intercepted request by validating a relationship between the new process component and the particular process component; and establishing a set of identified owners by identifying owners of the new process component, the particular process component and any parents thereof. In this first example, the agent validates the relationship between Adobe Reader and Microsoft Word. In this first example, the agent establishes the set of identified owners of Adobe Reader (child) and Microsoft Word (parent). The agent is configured to permit the intercepted request if the relationship is validated and if a trusted owner is identified amongst the set of identified owners. In this first example, the agent validates the relationship, for example positively, and a trusted owner, for example a local administrator, is identified amongst the set of identified owners. Hence, the agent permits this intercepted request such that an instance of Adobe Reader may be executed, for example by the operating system, according to the intercepted request originating from Microsoft Word. The agent inserts an identifier into the instantiated new process component. Notably, by inserting the identifier into the instantiated new process component, robustness of identifying the trusted owner amongst the set of owners is improved, even if a parent process having the trusted owner, for example, has been terminated or if the request originates only indirectly from the parent process having the trusted owner. In this way, instantiation of new process components may be better controlled, reducing security vulnerabilities that, for example, untrusted new process components may exploit by inheriting the default user privileges from the originating particular process components, while permitting instantiation of new process components that do originate from processes having trusted owners. In this way, user convenience is improved while security is upheld.

In the second example, as shown schematically at S102, the agent intercepts the request to instantiate a command shell window in the user account of the logged-in user, in which the request again originates from the instance of Microsoft Word. In this second example, the agent does not validate the relationship between command shell window and Microsoft Word, being an impermissible relationship, for example, as determined by the agent consulting a plurality of rules stored on the computer device 100. As in the first example, the agent establishes the set of identified owners of command shell window (child) and Microsoft Word (parent). In contrast to the first example, while a trusted owner, for example a local administrator, is identified amongst the set of identified owners, the agent validates the relationship, for example, negatively. Hence, the agent does not permit this intercepted request such that an instance of a command shell window may not be executed, for example by the operating system, according to the intercepted request originating from Microsoft Word.

In FIG. 1, the computer device 100 is coupled by the network 10 to another computer device 100' and a server 20. For example, the network 10 can be a private network, a virtual private network, an intranet, a cloud, or the Internet. In practice, computing environments for large-scale corporations include many thousands of individual user computer devices 100 coupled to thousands of individual servers 20 in several logical domains.

Computer Device

Figure 2:
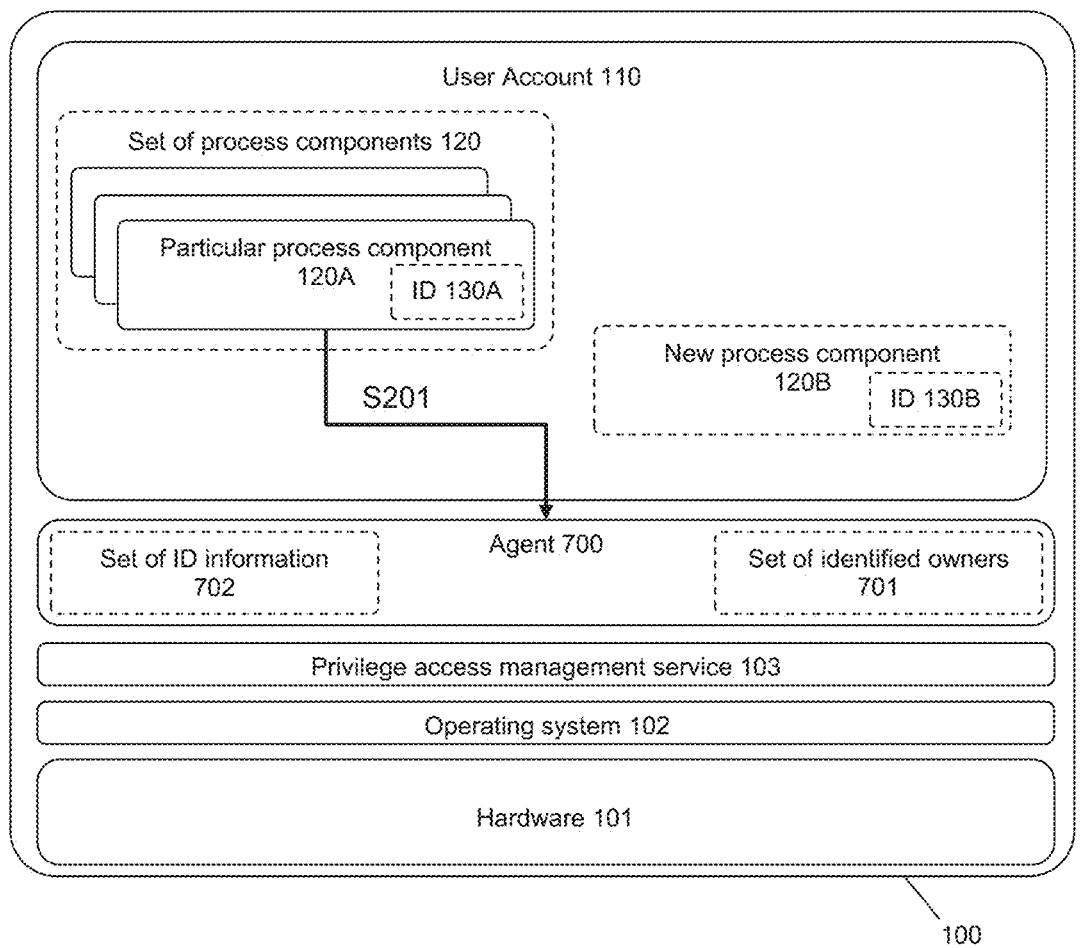
FIG. 2 is a schematic view of the computer device in more detail, in operation.

FIG. 2 is a schematic view of the computer device 100 in more detail.

The computer device 100 may take any suitable form factor, which might be a server, a desktop computer, a portable computing device, laptop, tablet, smartphone, etc. The illustrated computer device 100 comprises a layer of physical hardware H/W 101, which suitably includes memory, processors (CPUs), I/O input/output interfaces (e.g. NIC network interface cards, USB universal serial bus interfaces, etc.), storage (e.g. solid state non-volatile storage or hard disk drive) and so on. The hardware layer 101 supports the operating system 102 to provide a runtime environment for running of process components 120, such as user processes or productivity applications and/or software components thereof. This runtime environment typically provides resources such as installed software, system agent services, drivers, and files.

Some of the example embodiments are discussed in detail in relation to computers and computer devices using the Windows® operating system, for example the operating system 102, as supplied by Microsoft Corporation of Redmond, Wash., USA, under the trade marks Windows NT, Windows 2000, Windows XP, Windows Vista, Windows Server 2003, Windows Server 2008, Windows 7, Windows 8, Windows 10 or later versions, amongst others. However, the teachings, principles and techniques of the present invention are also applicable in other practical embodiments. For example, the described embodiments are also applicable to other operating systems, such as UNIX®, Linux®, mac OS®, iOS® and Android®, and in particular those having a discretionary access control (DAC) security model.

Privilege Management

In this example, the operating system 102 applies a security model wherein access privileges are based on a user account 110. The computer device 100 comprises the privilege access management service 103 cooperating with the operating system 102. The operating system 102, via the privilege access management service cooperating 103 for example, may define privilege levels appropriate to different classes of users, or groups of users, and then apply the privileges of the relevant class or group to the particular logged-in user (e.g. ordinary user, super-user, local administrator, system administrator and so on). The current user is authenticated such as by logging-in to the computer device 100, e.g. with a user identity and password, and these user credentials may be validated locally or via a remote agent service such as a domain controller. The user, via their previously prepared security account, thus acts as a security principal in the security model. The operating system 102 of the computer device 100 then grants privileges, appropriate to the security context of the user account 110, to the process components 120 when they execute in the user account 110. Particularly, when executing in the user account 110, the operating system 102 grants privileges to the process components 120, for example, by default.

When considering privilege management, it is desirable to implement a least-privilege access security model, whereby each user is granted only a minimal set of access privileges for their user account 110. However, even this minimal set of access privileges may present a vulnerability, allowing malicious attackers access to the computer device 100 or the network 10 via the computer device 100, for example. In addition, many applications require a relatively high privilege level, such as a local administrator level, in order to install and operate correctly. Hence, in practice, there is a widespread tendency to grant elevated privilege rights, such as the local administrator level, or a system administrator level, to all members of a relevant user group, and thus allow access to almost all of the resources of the computer device 100. That is, these elevated privileges may enable writing, as well as reading, of files to at least a part of a storage device of the computer device 100. This level of access may be greater than is desirable or appropriate from a security viewpoint. For example, there is a possibility of accidental tampering with the computer device 100, leading to errors or corruption within the computer device 100. Further, an infection or malware may maliciously access resources of the computer device 100 with the deliberate intention of subverting security or causing damage. Via the computer device 100, for example, the accidental tampering or malicious access may extend to the network 10. In this example, the user account 110 has assigned thereto default user privileges by the privilege access management service 103. Example of privilege access management services include Privileged Access Management (PAM) available from Microsoft and Defendpoint® available from Avecto Limited (UK). In one example, the privilege access management service 103 is configured to control privileges assigned to the user account 110. For example, the privilege access management service 103 may be configured to restrict privileges assigned to the user account 110, for example, to restrict privileges assigned to the user account 110 to the default user privileges, such as a minimal set of access privileges. For example, the privilege access management service 103 may be configured to deny a request to elevate the privileges assigned to the user account 110, for example to administrator privileges, such as local administrator and/or system administrator. In this way, writing of files, by process components 120 in the user account 110, to at least a part of a storage device of the computer device 100 and/or the network 10, may be controlled, for example restricted or prevented.

Agent

In this example, the computer device 100 further comprises the agent 700, which may configured to operate in cooperation with the operating system 102, the privilege access management service 103 and/or the process components 120. The agent 700 may comprise one or more software and/or hardware modules, such as executables, dynamic link libraries (DLLs), plug-ins, add-ins, add-ons or extensions. In particular, the agent 700 may provide and/or coordinate core capabilities for security, which suitably include at least process component control. The agent 700 may be included as part of the privilege access management service 103. The agent 700, optionally in cooperation with and/or included as part of the privilege access management service 103, may thus control the process components 120 on a per user account 110 and/or a per process component 120 basis, as described herein. This control by the agent 700 may be provided, for example, in combination with the restriction of privileges assigned to the user account 110 by the privilege access management service 103, as described previously.

For process component control, the agent 700 may be arranged to ensure that only authorised process components 120 run on the computer device 100. For example, the agent 700 may be governed by rules based on trusted process components, thereby automatically stopping unapproved process components from running. There may be a sophisticated set of rules which define the conditions under which each process component may run, in relation to the intended host computer device 100 and/or the relevant user account 110, as described below.

In one example, the agent comprises an agent service cooperating with the operating system 102 and/or included as part of the privilege access management service 103, an agent plugin configured to intercept the request and/or a policy server, as described below in more detail.

Process Components

Generally, process components may include out-of-process components and in-process components. An out-of-process component runs in its own process, with its own thread of execution, for example an executable file such as a .exe file. An in-process component runs in the same process as a client or parent of the in-process component, for example a library such as a shared library (also known as a shared object) such as a .dll or .ocx file. Dynamic-link library (or DLL) is Microsoft's implementation of the shared library concept in the Microsoft Windows and OS/2 operating systems. Shared libraries are files that are intended to be shared by out-of-process components, for example executable files, and/or other shared libraries. Modules used by out-of-process components are usually dynamically linked, being loaded from individual shared libraries into memory at load time or run time. Shared libraries may instead be statically linked, meaning that references thereto are resolved and the modules are allocated memory when the executable file is created. Hence, the request to instantiate the new process component 120B generally may cause a library (i.e. an in-process component) to be loaded or an application (i.e. an out-of-process) to be run.

Due to a vulnerability commonly known as DLL hijacking, DLL spoofing, DLL preloading or binary planting, process components may inadvertently cause loading of a malicious DLL, contained in the same folder as a data file opened by these process components. Particularly, out-of-process components, for example executable files, that are run from unsafe locations, for example user-writable folders like Downloads or Temp folders, may be susceptible to this vulnerability. Hence, it is desirable to prevent loading of such malicious libraries.

The request to instantiate the new process component 120B in the user account 110 of the logged-in user request originates from the instance of the particular process component 120A amongst the set of process components 120. Typically, the new process component 120B (which may be termed a child) inherits privileges of the particular process component 120B (which may be termed a parent). Generally, the particular process component 120B may in turn be a child of another process component 120. Similarly, the new process component 120B may subsequently be a parent of another process component 120. Hence, the privileges of a root process component 120 (i.e. the highest or most senior parent) may be inherited by descendent, for example all descendent, child process components. In this way, a malicious new process component 120B may exploit a vulnerability afforded by having these inherited privileges. Hence, preventing such malicious new process components 120B from instantiating upholds security of the computer device 100. The new process component 120B may be amongst the set of process components 120. Conversely, the new process component 120B may not be amongst the set of process components 120.

In one example, the particular process component 120A is an out-of-process component. In one example, the particular process component 120A is an in-process component. In one example, the new process component 120B is an out-of-process component. In one example, the new process component 120B is an in-process component. In one example, the set of process components 120 comprises at least one out-of-process component, for example an executable file for Microsoft Office applications (such as Microsoft Word, Microsoft Excel, Microsoft Powerpoint and/or Microsoft Publisher), for Adobe applications (such as Adobe Acrobat Reader) and/or browser applications (such as Mozilla Firefox®, Google Chrome®, Microsoft Internet Explorer®, Apple Safari® and Opera®). In one example, the set of process components 120 comprises at least one in-process component, for example a shared library file, such as .dll and/or .ocx file for Microsoft Office applications, for Adobe applications and/or for browser applications. In one example, the set of process components 120 comprises at least one out-of-process component and at least one in-process component. The set of process components 120 may include a trusted process component, for example a certified process component having a digital certificate which may be verified by certification authorities, trusted to verify identities of software publishers and to manage lists of valid and expired or revoked digital certificates. Some or all of the set of process components 120 may be approved for running on the computer device 100, for example by an administrator of the computer device 100. For example, the set of process components 120 may comprise Microsoft Office applications (such as Microsoft Word, Microsoft Excel, Microsoft Powerpoint and/or Microsoft Publisher), for Adobe applications (such as Adobe Acrobat Reader) and/or browser applications (such as Mozilla Firefox®, Google Chrome®, Microsoft Internet Explorer®, Apple Safari® and Opera®). Additionally and/or alternatively, the set of process components 120 may include an untrusted process component and/or high risk process component. Notably, untrusted or high-risk does not mean that the respective process component is necessarily malicious. Rather, via the untrusted or high-risk process component 120, there is a possibility of introducing an undesired effect, such as interfering with other process components 120 or content on or accessible via the computer device 100. In some cases, the undesired effect may be malicious. For example, malicious software such as scripts, add-ons or plugins running in the untrusted or high-risk process component 120 may attempt to compromise security of the computer device 100, directly or indirectly. Direct attempts to compromise security of the computer device 100 may include unauthorised accessing and/or tampering with the computer device 100 by the malicious software. Indirect attempts to compromise security may include enabling the user to download a malicious file, execute a virus or gain access to the computer device 100, for example via spoofing, pharming or phishing. Notably, some or all of the set of untrusted or high-risk process components 120 may still be approved for running on the computer device 100, for example by an administrator of the computer device 100. For example, Microsoft Office applications (such as Microsoft Word, Microsoft Excel, Microsoft Powerpoint and/or Microsoft Publisher), for Adobe applications (such as Adobe Acrobat Reader) and/or browser applications (such as Mozilla Firefox®, Google Chrome®, Microsoft Internet Explorer®, Apple Safari® and Opera®) may be approved software but may still be untrusted or high-risk process components 120, for example due to vulnerabilities that these process components 120 may expose. Hence, it is desirable to control instantiation of new process components originating from these untrusted or high-risk process components.

In one example, the request is to instantiate a new in-process component 120B in the user account 110 of the logged-in user and the request originates from the instance of a particular out-of-process component 120A amongst a set of process components 120. In this example, instantiation of the new in-process component 120B may comprise loading (also known as mapping) a shared library. In one example, the request is to instantiate a new out-of-process component 120B in the user account 110 of the logged-in user and the request originates from the instance of a particular out-of-process component 120A amongst a set of process components 120. In this example, instantiation of the new out-of-process component 120B may comprise creating a new instance of an executable application, causing execution thereof on the computer device 100. In one example, the request is to instantiate a new in-process component 120B in the user account 110 of the logged-in user and the request originates from the instance of a particular in-process component 120A amongst a set of process components 120. In one example, the request is to instantiate a new out-of-process component 120B in the user account 110 of the logged-in user and the request originates from the instance of a particular in-process component 120A amongst a set of process components 120.

In one example, the agent 700 is configured to intercept a request to instantiate a new in-process component 120B comprising loading a shared library, as described above.

In one example, the agent 700 is configured to intercept a request to instantiate a new out-of-process component 120B comprising creating a new instance of an executable application, as described above.

The request to instantiate the new process component 120B in the user account of the logged-in user request originates from the instance of the particular process component 120A amongst the set of process components 120. For example, the request may result from the user selecting an icon or a name of a file associated with the new process component 120B in the particular process component 120A. Typically, such selection of the file causes execution of the associated new process component 120B. For example, clicking on the name of an Adobe Acrobat file (i.e. Adobe Acrobat Reader is the new process component 120B) in a Microsoft Word document (i.e. Microsoft Word is the particular process component 120A) causes Adobe Acrobat Reader to be executed and the named Adobe Acrobat document to be opened therein. For example, the request may result programmatically, such as directly from the particular process component 120A, or an in-process component thereof, or indirectly from a script, add-on or plugin running in the particular process component 120A, or an in-process component thereof.

Intercepting a Request

The agent 700 is configured to intercept the request to instantiate the new process component 120B. For example, the agent 700 may be configured to intercept the request by hooking relevant application programming interfaces (APIs) of and/or related to the particular process component 120A and/or the new process component 120B. For example, the agent 700 may be configured to intercept the request by monitoring loading of in-process components 120 on the computer device 100, such as by monitoring file activity in the kernel. In one example, the agent 700 comprises an agent plugin configured to intercept the request, as described.

In one example, the agent 700 is configured to identify an identity of the particular process component from the intercepted request and/or an identity of the new process component from the intercepted request. For example, the agent 700 may be configured to such identities by hooking relevant APIs of and/or related to the particular process component 120A and/or the new process component 120B.

In Microsoft Windows, a function SetWindowsHookEx may be used by the agent 700 to install an application-defined hook procedure into a hook chain, for example to monitor the computer device 100 for certain types of events. These events are associated either with a specific thread or with all threads in the same desktop as the calling thread.

In Microsoft Windows, a function LoadLibrary may be intercepted by the agent 700. The function LoadLibrary loads a specified module (i.e. the new in-process component 120B) into the address space of the calling process (i.e. the particular process component 120A). The specified module may cause other modules (i.e. other new in-process components 120B) to be loaded. A parameter IpFileName identifies the identity of the new process component. Another similar function on Microsoft Windows includes LoadLibraryEx, which allows actions to be taken when loading the module to be defined.

In Microsoft Windows, a function CreateProcess may be intercepted by the agent 700. The function CreateProcess creates a new out-of-process component that runs in the same security context (i.e. with the same privileges) as the calling process (i.e. the particular process component). A parameter IpApplicationName identifies the identity of the new process component. Other similar functions on Microsoft Windows include CreateProcessAsUser and CreateProcessWithLogonW, which allow different security contexts to be specified, for example via impersonation tokens.

In Microsoft Windows, a function ShellExecute may be intercepted by the agent 700. The function ShellExecute may be used to create a new out-of-process component that runs in the same security context (i.e. with the same privileges) as the calling process (i.e. the particular process component). A parameter IpFile may identify the identity of the new process component. That is, the commands may cause tasks to be performed on the computer device 100 and/or the network 10. Some of these tasks may be considered 'untrusted' tasks. Notably, 'untrusted' does not mean that the respective task is necessarily malicious. Instead, the untrusted task simply has the possibility of introducing undesired effect, such as interfere with other tasks or content on or accessible via the computer device 100. For example, untrusted tasks may include certain forms of Web browsing, viewing email files, starting an untrusted application program, or accessing a particular file in a storage medium. Hence, it is desirable to control execution of commands on files.

In one example, the agent 700 is configured to intercept instantiation of the new process component 120B, for example upon and/or during creation and/or launching thereof. For example, the agent 700 may be configured to intercept the instantiation by hooking relevant application programming interfaces (APIs) of and/or related to the new process component 120B. In one example, the agent 700 comprises an agent plugin configured to intercept the instantiation, as described. In one example, the agent 700 is configured to suspend (also known as pause) instantiation of the new process component 120B, for example upon and/or during creation and/or launching thereof. In one example, the agent 700 is configured to insert the identifier 130B into the suspended, instantiated new process component 120B if the intercepted request is permitted. In one example, the agent 700 is configured to resume (also known as restart) instantiation of the suspended new process component 120B, for example upon and/or during creation and/or launching thereof. In other words, the agent 700 may suspend temporarily the new process component 120B, insert the identifier 130B therein and subsequently resume running of the new process component 120B. Where the identifier 130B is an access token, as described below, for example, exchange of a default access token with the identifier 130 may only be permitted when the new process component 120B is suspended and/or before execution of the new process component 120B has commenced, and thus for example only during instantiation.

In Microsoft Windows, one or more of the functions CreateProcessInternalW, CreateProcessAsUserW and ShellExecuteExW may be intercepted by the agent 700. In this way, the agent 700 may determine when the new process component 120B is being launched. Additionally and/or alternatively, the agent 700 may include a Windows driver, using the PsSetCreateProcessNotifyRoutine API, to determine when the new process component 120B is being launched.

Determine Whether to Permit an Intercepted Request

The agent 700 is configured to determine whether to permit the intercepted request including by validating a relationship between the new process component 120B and the particular process component 120A and establishing a set 701 of identified owners by identifying owners of the new process component, the particular process component and any parents thereof. That is, determining whether to permit the intercepted request is dependent on least two criteria: a validated relationship and a set 701 of identified owners. These two criteria balance reducing risk while reducing management overhead, as described below in more detail. Furthermore, while ownership of process components is typically not employed as a security boundary, the inventors have realised that this is advantageous, better upholding security of the computer device 100. Hence, instantiation of only new process components 120B derived from particular process components 120A having trusted owners is permitted.

In more detail, the agent 700 is configured to validate a relationship between the new process component 120B and the particular process component 120A. Validating the relationship may include examining the new process component 120B and/or the particular process component 120A. For example, validating the relationship may include examining whether the new process component 120B and/or the particular process component 120A is an approved or trusted process component. For example, validating the relationship may include examining whether the new process component 120B is an approved and/or trusted process component that may be instantiated in response to the request originating the particular process component 120A. A set of approved and/or trusted new process components 120, for example a whitelist, may be predetermined, for example by a system or local administrator, and provided on and/or for the computer device 100 and/or the user account 110. In this way, for example, controlling process components 120 as described herein may be configured on a per computer device 100 and/or a per user account 110 basis. The set of approved and/or trusted new process components 120 may be predetermined for the particular process component 120A, for example as mappings between the particular process component 120A and the approved and/or trusted new process components 120 included in the set thereof. Such a set of approved and/or trusted new process components 120 may be predetermined respectively for each of the process components 120 included in the set of process components. Additionally and/or alternatively, a set of disapproved and/or untrusted new process components 120, for example a blacklist, may be predetermined, for example by a system or local administrator, and provided on and/or for the computer device 100 and/or the user account 110. The set of disapproved and/or untrusted new process components 120 may be predetermined for the particular process component 120A for example as mappings between the particular process component 120A and the disapproved and/or untrusted new process components 120 included in the set thereof. Such a set of disapproved and/or untrusted new process components 120 may be predetermined respectively for each of the process components 120 included in the set of process components. In this way, specific permitted and/or denied relationships between process components 120 may be configured, for example. By default, any other new process component 120B not included in the set of approved and/or trusted new process components or in the set of disapproved and/or untrusted new process components may be validated by the agent 700 as a disapproved and/or untrusted new process component.

For example, where the particular process 120A is a Microsoft Office application, an Adobe Application or a browser, a set of disapproved and/or untrusted new process components 120 may include a script host and/or an exploit tool. Script hosts may provide batch file functionality. In Microsoft Windows, Microsoft Windows Script Host (WSH) is an automation technology that provides scripting abilities comparable to batch files, but with a wider range of supported features. Exploit tools may exploit vulnerabilities in the operating system 102, the particular process 120A and/or via the new process component 120B. An administrator such as a system administrator or a local administrator may, for example, determine that script tool and/or exploit tools may not be launched from such particular processes 120A.

Rules

In one example, the agent 700 is configured to validate the relationship between the new process component 120B and the particular process component 120A by consulting a plurality of rules stored on the computer device 100. These rules may relate, for example, to the set of approved and/or trusted new process components and/or the set of disapproved and/or untrusted new process components. In one example, the plurality of rules includes mappings between trusted and/or untrusted process components, as described previously.

In one example, the agent 700 is coupled to a policy file. The policy file may store a set of policies (rules) which define, at least in part, responses of the agent 700 to the request. A policy server may be provided to make policy decisions based on the policy file. The policy server may operate by receiving a policy request message, concerning a requested action and related meta-information, and returning a policy result based thereon. In one example, the agent 700 is configured to capture a set of identities, and may then provide these identities as part of the policy request. Such identities may include a user identity (UID) of the relevant user account, a group identity (GID) of a group to which that user account belongs, a process identity (PID) of a current process which has initiated the action or task in question, and/or a process identity of a parent process (PPID). Suitably, the policy server determines an outcome for the request based on the provided set of identities relevant to the current policy request.

In one example, the policy file is a structured file, such as an extensible mark-up language XML file. The policy file is suitably held locally on the host device 100, ideally in a secure system location which is accessible to the agent 700 but which is not accessible by and/or from the user account 110. Updates to the policy file may be generated elsewhere on the network 10, such as by using a management console on one of the servers 20, and then pushed, or pulled, to each instance of the agent 700 on each device 100. The policy file is readily updated and maintained, ensuring consistency for all devices across the network. In this way, the agent 700 is robust and manageable for a large-scale organisation with many thousands of individual computer devices 100. Also, the agent 700 is able to leverage rules which have been developed in relation to application control, such as defining user groups or user roles and related application permissions, and now extend those same rules also to privilege management, and vice versa.

Trusted Owner

Generally, objects such as process components have owners. Discretionary access control (DAC) is a policy determined by the owner of an object. The owner decides which users are allowed to access the object, and what privileges they have. Two important concepts in DAC are: file and data ownership; and access rights and permissions. Particularly, every object has an owner. In most DAC systems, each object's initial owner is the subject (for example a user such as a local administrator) that caused it to be created, for example, upon installation. Additionally, ownership may be assigned from the owner to a new owner. The access policy for an object is determined by its owner. Access rights and permissions are the controls that the owner can assign to other subjects (for example users) for specific resources.

For some objects, for example some process components, owners are trusted owners, for example administrators such as local administrators and system administrators, SYSTEM or TrustedInstaller. That is, trusted owners have trusted owner accounts, for example Administrator, SYSTEM or TrustedInstaller. TrustedInstaller is a built-in user account in Microsoft Windows 10, Windows 8, Windows 7, and Windows Vista. This TrustedInstaller user account is owner of a variety of system files, including some files in Program Files folders and Windows folders, for example. Conversely, for other objects, for example other process components, owners may be untrusted owners.

In more detail, the agent 700 is configured to establish the set 701 of identified owners by identifying owners of the new process component 120B, the particular process component 120A and any parents thereof. The parents may include other process components 120, as described previously. Alternatively, the particular process component 120A may be a root process component 120A and thus have no parent. The agent 700 may identify an owner of each process component 120 in turn, for example by ascending the hierarchy including the new process component 120B, the particular process component 120A and any parents thereof, and thereby establish the set 701 of identified owners.

In Microsoft Windows, functions GetSecurityInfo and LookupAccountSid may be called by the agent 700 to identify an owner of a process component 120. These functions may be called repeatedly to identify respective owners of the new process component 120B, the particular process component 120A and any parents thereof.

Authorization

In one example, the agent 700 is configured to establish authorization from the user to permit the intercepted request and the agent 700 is configured to permit the intercepted request if the authorization is established.

In one example, the agent 700 is configured to establish authorization by providing a graphical user interface, GUI, dialog comprising at least one of a confirmation, a challenge-response, and a reason and receiving a response therefrom.

The agent 700 may be configured to perform custom messaging via the dialog. This dialog may be presented in a terminal from which a current action of interest was invoked by or on behalf of the user. Thus, the custom messaging may be presented on a display of the computer device 100 for interaction with the user. Input from the user may be returned to the agent 700 for evaluation. Hence, the agent 700 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication and/or authorization to be presented by the user in order to proceed with the requested action. As an example, additional authentication may require the user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policy file to meet the evolving needs of a large user population.

Custom messaging allows the agent 700 to provide a rich and informative set of interactions with the users. Each of these individual custom messaging actions may be defined in the policy file. The custom messaging may eventually result in a decision to allow or block the requested action. An appropriate allow (permit) or block (deny) operation may then be carried out as required.

Auditing

The agent 700 may perform auditing in relation to all requests or at least certain requests. The auditing may include recording the customised messaging, and may include recording an outcome of the request. Audit reports may be extracted or uploaded from each computer device 100 such as to the management console on the servers 20 at any suitable frequency. Each of these auditing functions may be defined in the policy.

Permitting the Intercepted Request

The agent 700 is configured to permit the intercepted request if the relationship is validated, for example positively validated, and if a trusted owner is identified amongst the set 701 of identified owners. As described above, permitting the intercepted request is dependent on least two criteria: the validated relationship and the trusted owner amongst the set 701 of identified owners. These two criteria balance reducing risk while reducing management overhead.

Validation of the relationship may be as described above, for example, according to the rules and/or the set of approved and/or untrusted new process components 120A and/or the set of disapproved and/or untrusted new process components 120A. It is sufficient that one (i.e. a single)

trusted owner is identified amongst the set 701 of identified owners. However, more than one trusted owner may be identified amongst the set 701 of identified owners. Additionally and/or alternatively, once a trusted owner is identified amongst the set 701 of identified owners, the agent 700 may stop identifying owners, for efficiency. If the intercepted request is permitted by the agent 700, the agent 700 may cause the new process component 120B to be instantiated, for example by forwarding the intercepted request to the operating system 102.

However, if the intercepted request is not permitted (i.e. denied) by the agent 700, the agent 700 may behave differently. In one example, the agent 700 is configured to deny the intercepted request if the relationship is not validated (for example, negatively validated) and/or if the trusted owner is not identified amongst the set 701 of identified owners. In one example, the agent 700 is configured to notify the user if the intercepted request is denied.

Inserting the Identifier

The agent 700 is configured to insert the identifier 130B into the instantiated new process component 120B if the intercepted request is permitted. By inserting the identifier 130B into the instantiated new process component 120B, identification, for example tracking, of relationships between process components 120, such as the particular process component 120A, and trusted owners, such as the trusted owner, may be improved, even if the process components 120 having trusted owners have been terminated or if the requests originate only indirectly from the process components 120 having the trusted owners.

Particularly, if a parent process component 120, having a trusted owner, has been terminated (i.e. previously terminated), the agent 700 may otherwise deny the request, rather than permit the request, since the trusted owner may no longer be included amongst the set 701 of identified owners, for example having been removed therefrom or not added thereto because the parent process component 120 has been terminated. It should be understood that the parent process component 120, having the trusted owner, may be the parent (more generally, an ancestor or antecedent) of the particular process 120A. That is, the parent process component 120 is not the particular process component 120A (nor the new process component 120B). This may occur, for example, if the particular process 120A does not directly have the trusted owner but is itself a child of the parent process component 120 having the trusted owner. If the parent process component 120 has been terminated, it may not otherwise be possible to identify the trusted owner of the particular process component 120A. According to a default behaviour of the computer device 100, such information is not retained or retrievable after the parent process component 120 is terminated. For example, according to the default behaviour of the computer device 100, the owner of a process component is identified dynamically (i.e. upon demand) and thus owners may only be identified for current process components.

Further, if the request originates only indirectly from a parent process component 120 having a trusted owner, the agent 700 may also otherwise deny the request, rather than permit the request, since the trusted owner is not included amongst the set 701 of identified owners. For example, the trusted owner may not have been added thereto because a relationship between the parent process component 120, having the trusted owner, and the particular process component 120A may not be available according to the default behaviour of the computer device 100. For example, if the particular process component 120A is launched indirectly by the parent process component 120, having the trusted owner, via a service or a surrogate process such as provided by the operating system 102, a parent of the particular process component 120A is identified as the service or the surrogate process, rather than the parent process component 120, having the trusted owner. In such a case, an owner of the particular process component 120A may be identified incorrectly.

In one example, the identifier 130B comprises a unique identifier 131B of the new process component 120B. In one example, the unique identifier 131B is a globally unique identifier (GUID) or a locally unique identifier (LUID), for example, generated or obtained by the agent 700. In this way, the new process component 120B may be uniquely identified. Furthermore, in this way, the particular process component 120A may also be similarly uniquely identified. Generally, in this way, each process component 120 may be uniquely identified.

In one example, the identifier 130B comprises a unique identifier 131A of a parent process component 120 of the new process component. For example, the parent process component may have the trusted owner. It should be understood that the parent process component having the trusted owner may be the particular process component 120A or a parent thereof. In this way, the identifier 130B thus directly maps the new process component 120B with the parent process component 120, for example having the trusted owner, thereby facilitating identification thereof.

In one example, the identifier 130B is a token, for example an access token, and wherein the agent 700 is configured to insert the identifier 130B into the instantiated new process component 120B if the intercepted request is permitted by exchanging an existing token of the instantiated new process component 120B with the identifier 130B.

Generally, an access token is an object that describes a security context of a process or thread. Information in a token includes the identity and privileges of a user account associated with the process or thread. When a user logs on, the system verifies the user's password by comparing it with information stored in a security database. If the password is authenticated, the system produces an access token. Every process executed on behalf of this user has a copy of this access token. The system uses an access token to identify the user when a thread interacts with a securable object or tries to perform a system task that requires privileges. Every process has a primary token that describes the security context of the user account associated with the process. By default, the system uses the primary token when a thread of the process interacts with a securable object. Moreover, a thread can impersonate a client account. Impersonation allows the thread to interact with securable objects using the client's security context. A thread that is impersonating a client has both a primary token and an impersonation token.

In Microsoft Windows, the token may be a Windows access token, described according to the following structures:

TOKEN_CONTROL: Information that identifies an access token.

TOKEN_DEFAULT_DACL: The default DACL that the system uses in the security descriptors of new objects created by a thread.

TOKEN_GROUPS: Specifies the SIDs and attributes of the group SIDs in an access token.

TOKEN_OWNER: The default owner SID for the security descriptors of new objects.

TOKEN_PRIMARY_GROUP: The default primary group SID for the security descriptors of new objects.

TOKEN_PRIVILEGES: The privileges associated with an access token. Also determines whether the privileges are enabled.

TOKEN_SOURCE: The source of an access token.

TOKEN_STATISTICS: Statistics associated with an access token.

TOKEN_USER: The SID of the user associated with an access token.

Particularly, the TOKEN_SOURCE structure may be modified to include the unique identifier 131B and/or the unique identifier 131A.

typedef struct _TOKEN_SOURCE {
CHAR SourceName[TOKEN_SOURCE_LENGTH];
LUID SourceIdentifier;
} TOKEN_SOURCE, *PTOKEN_SOURCE;

The token's source identifier SourceIdenfitier is typically displayed as being split into two distinct pieces: a 'high part' and a 'low part'. Each time a child process is launched with a modified token, the high part of the token may be replaced with the low part and a newly-generated unique identifier to be stored in the low part. In this way, the high part of any child token may be matched with the low part of its parent. As the low part of the source identifier is a 32 bit DWORD, up to 4,294,967,295 ($2^{32}-1$) unique identifiers may be enumerated.

In one example, the agent 700 is configured to store (i.e. persist) information related to the identifier 130B in a set 702 of identifier information and wherein the agent 700 is configured to establish the set 702 of identified owners by identifying owners of the new process component 120B, the particular process component 120A and any parents thereof by identifying the owners using the set 702 of identifier information. In this way, the trusted owner may be identified even if the parent process having the trusted owner is terminated.

In one example, the set 702 of identifier information includes the unique identifier 131B of the new process component 120B and the unique identifier 131A of the particular component 120A. In one example, the set 702 of identifier information includes for each parent process component 120, a list of respective child process components 120, for example all child process components thereof. In this way, searching of the set 702 of identifier information may be accelerated. In one example, the set 702 of identifier information is implemented as a cache, for example a tree cache. In one example, the set 702 of identifier information is stored on non-transient storage, for example hard disk drive (HDD) or solid state drive (SSD). In this way, the set 702 of identifier information may be restored, if required.

In one example, the agent 700 is configured to delete (i.e. remove) the stored information related to the identifier 130B from the set 702 of identifier information if the instantiated new process component 120B is terminated. In this way, the set 702 of identifier information may be reduced to include only current process components 120. In this way, searching of the set 702 of identifier information may be accelerated.

In Microsoft Windows, Windows APIs OpenProcess and GetExitCodeProcess may be used to query if a process component is still alive (i.e. not terminated). If a queried process component is terminated, and the process component has no child process components that are currently alive, the stored information related to the identifier for that queried process component may be deleted from the set 702 of identifier information. Otherwise, the stored information related to the identifier for that queried process component is retained in the set 702 of identifier information.

Hence, as shown in FIG. 2, the agent 700 intercepts the request to instantiate the new process component 120B in the user account 110 of the logged-in user, wherein the request originates from the instance of the particular process component 120A amongst a set of process components 120 and wherein the user account 110 has assigned thereto default user privileges by the privilege access management service. The agent 700 determines whether to permit the intercepted request including by: validating the relationship between the new process component 120B and the particular process component 120A; and establishing a set 701 of identified owners by identifying owners of the new process component 120B, the particular process component 120A and any parents thereof. The agent 700 permits the intercepted request if the relationship is validated (for example, positively validated) and if a trusted owner is identified amongst the set 701 of identified owners. The agent 700 inserts the identifier 130B into the instantiated new process component 120B if the intercepted request is permitted.

Method

Figure 3:
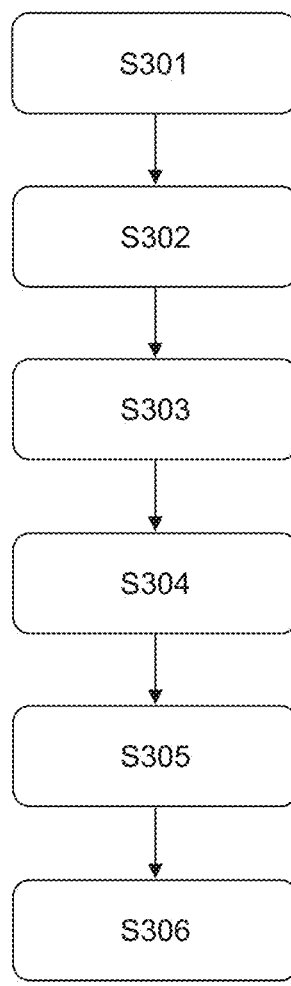
FIG. 3 is a flowchart of an example method of operating the computer device.

FIG. 3 is a flowchart of an example method of operating the computer device 100, as described above. The method is of controlling process components 120 on the computer device 100. This example method may include any of the steps described herein.

At S301, the agent 700 intercepts a request to instantiate a new process component 120B in a user account 110 of a logged-in user, wherein the request originates from an instance of a particular process component 120A amongst a set of process components and wherein the user account 110 has assigned thereto default user privileges by a privilege access management service 103 cooperating with an operating system 102 of the computer device 100.

Intercepting the request may comprise intercepting a request to instantiate a new in-process component comprising loading a shared library. Intercepting the request may comprise intercepting a request to instantiate a new out-of-process component comprising creating a new instance of an executable application.

The method may comprise identifying, by the agent 700, an identity of the particular process component 120A from the intercepted request and/or an identity of the new process component 120B from the intercepted request.

At S302, the agent 700 determines whether to permit the intercepted request, including steps as described below.

Determining whether to permit the intercepted request may comprise establishing, by the agent 700, authorization from the user to permit the intercepted request and wherein permitting the intercepted request comprises permitting, by the agent 700, the intercepted request if the authorization is established. Establishing authorization may comprise providing a graphical user interface, GUI, dialog comprising at least one of a confirmation, a challenge-response, and a reason, and receiving a response therefrom.

At S303, the agent 700 validates a relationship between the new process component 120B and the particular process component 120A.

Validating the relationship between the new process component and the particular process component may comprise consulting, by the agent 700, a plurality of rules stored on the computer device. The plurality of rules may include mappings between trusted and/or untrusted process components.

At S304, the agent 700 establishes a set 701 of identified owners by identifying owners of the new process component 120B, the particular process component 120A and any parents thereof.

At S305, the agent 700 permits the intercepted request if the relationship is validated and if a trusted owner is identified amongst the set 701 of identified owners.

At S306, the agent 700 inserts the identifier 130B into the instantiated new process component 120B if the intercepted request is permitted.

The identifier 130B may comprise a unique identifier 131B of the new process component 120B. The identifier 130B may comprise a unique identifier 131A of a parent process component of the new process component 120B, for example having the trusted owner. The identifier 130B may be a token and inserting, by the agent 700, the identifier 130B into the instantiated new process component 120B if the intercepted request is permitted may comprise exchanging an existing token of the instantiated new process component 120B with the identifier 130B. The method may comprise storing information related to the identifier 130B in a set 702 of identifier information and wherein establishing the set 701 of identified owners by identifying owners of the new process component 120B, the particular process component 120A and any parents thereof comprises identifying the owners using the set 702 of identifier information. The method may comprise deleting the stored information related to the identifier 130B from the set 702 of identifier information if the instantiated new process component 120B is terminated.

The method may comprise denying, by the agent 700, the intercepted request if the relationship is not validated and/or if the trusted owner is not identified amongst the set 701 of identified owners. The method may comprise notifying the user, by the agent 700, if the intercepted request is denied.

EXAMPLE

Figure 4:
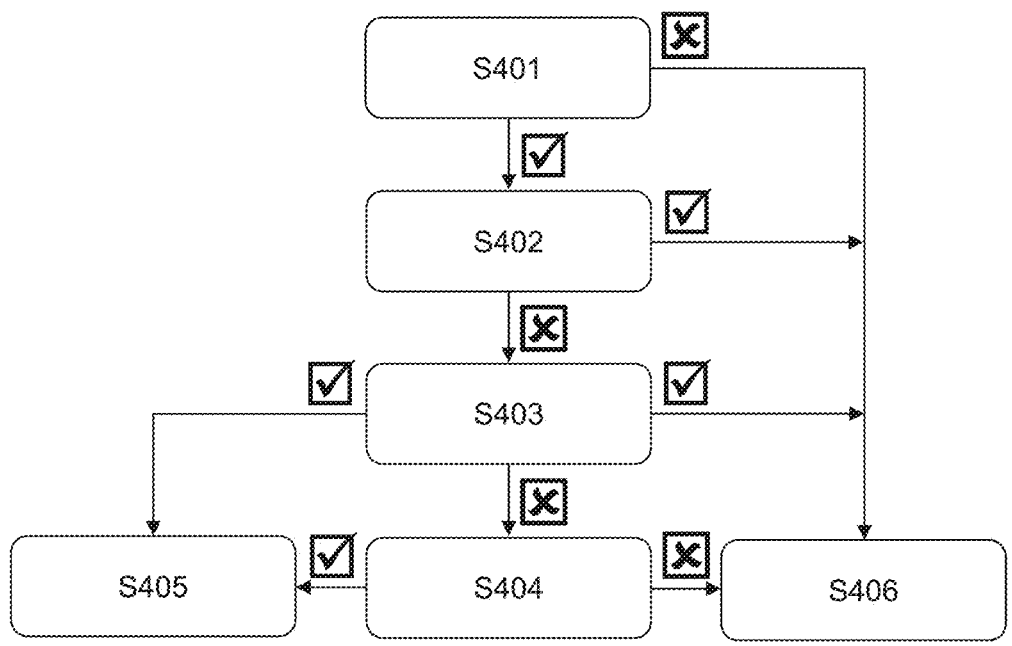
FIG. 4 is a flowchart of an example method of operating the computer device.

FIG. 4 is a flowchart of an example of a process or rules to determine whether to permit the intercepted request including by: validating a relationship between the new process component 120B and the particular process component 120A; and establishing a set 701 of identified owners by identifying owners of the new process component 120B, the particular process component 120A and any parents thereof on the computer device 100, as described above.

At S401, if the particular process component 120A is a descendent of a high risk process component 120, the process continues to S402, or the process continues to S406 otherwise.

At S402, if the new process component 120B is an excluded process component 120, the process continues to S406, or the process continues to S403 otherwise.

At S403, if the new process component 120B is a blacklisted process component 120, the request is denied at S405, or the process continues to S404 otherwise.

At S404, if the new process component 120B is not a trusted process component 120, for example not owned by a trusted user and/or signed by a trusted publisher, the request is denied at S405, or the process continues to S406 otherwise.

At S405, the request is permitted.

Figure 5A:
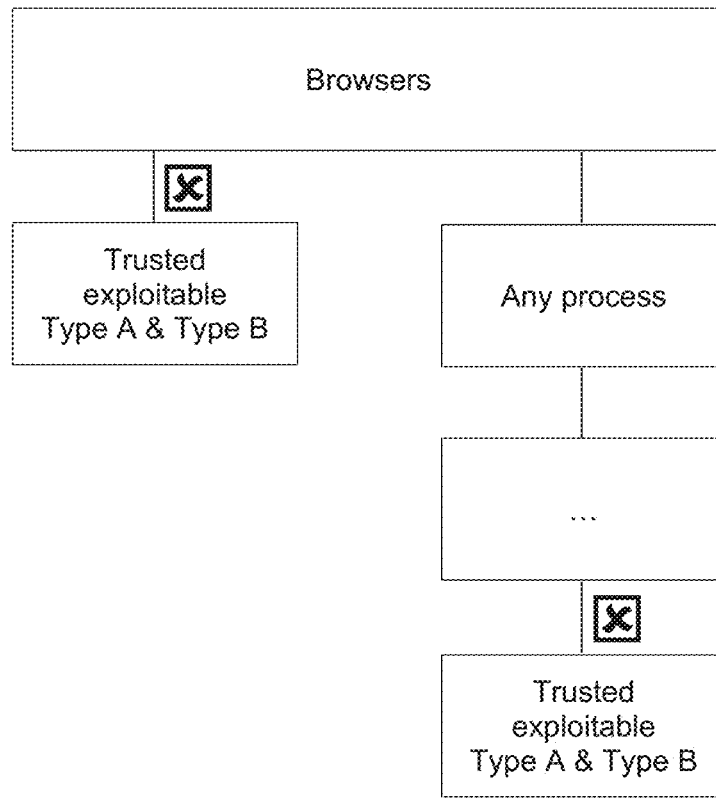
FIGS. 5A-5C are flowcharts of an example method of operating the computer device.
Figure 5B:
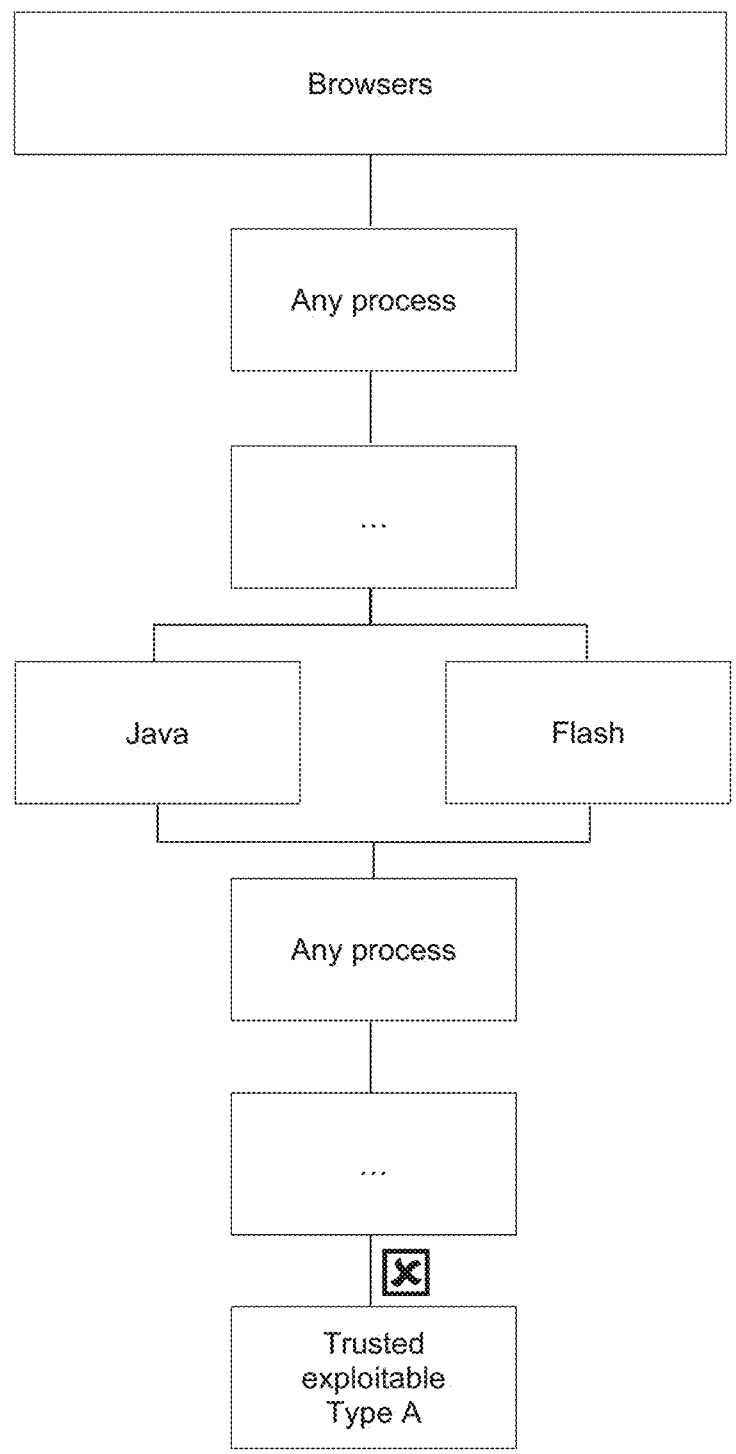
Figure 5C:
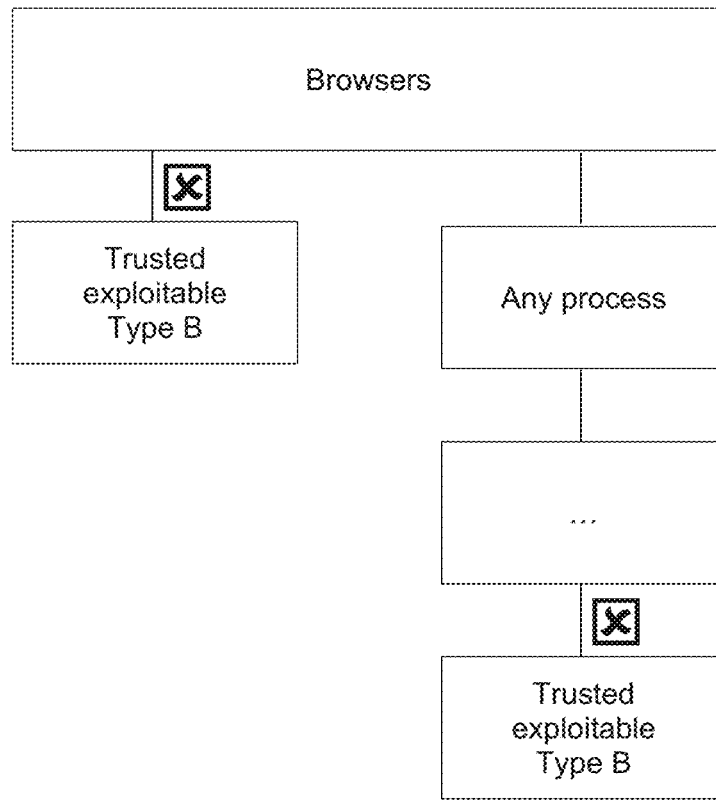

FIGS. 5A-5C are flowcharts of an example method of operating the computer device 100, under Microsoft Window. Particularly, FIGS. 5A-5C schematically illustrate examples of denying (for example, blocking) requests to instantiate trusted exploitable new process components 120B, the requests originating directly from browsers and/or indirectly from browsers from descendants (for example, children) thereof (i.e. particular process components).

As shown in FIG. 5A, requests to instantiate trusted exploitable Type A and Type B new process components 120B are denied (for example, blocked) if the requests originate directly from browsers and/or indirectly from browsers from descendants thereof (i.e. particular process components). Alternatively, requests to instantiate trusted exploitable Type A new process components 120B may be permitted if the requests originate directly from browsers and/or indirectly from browsers from descendants thereof (i.e. particular process components).

Examples of trusted exploitable Type A new process components 120B include PSExec, Reg, Regsvr & ieexec, PowerShell & PowerShell ISE, Bash.exe, Bginfo.exe, Bcdedit.exe, Cdb.exe, Cmd.exe, Vssadmin.exe, CScript.exe, Wscript.exe, Csi.exe, Dnx.exe, Fsi .exe, FsiAnyCpu.exe, Kd.exe, Mshta.exe, Msbuild.exe, Ntkd.exe, Psexec.exe and Rcsi.exe. These Type A new process components 120B include out-of-process components.

Examples of trusted exploitable Type B new process components 120B include Bash.exe, Bcdedit.exe, Cdb.exe, Vssadmin.exe, Csi.exe, Dnx.exe, Fsi.exe, FsiAnyCpu.exe, Kd.exe, Mshta.exe, Msbuild.exe, Ntkd.exe, Ntsd.exe, PSExec.exe, Rcsi.exe and Windbg.exe. These Type B new process components 120B include out-of-process components.

As shown in FIG. 5B, requests to instantiate trusted exploitable Type A new process components 120B are denied (for example, blocked) if the requests originate directly from browsers and/or indirectly from browsers from descendants thereof (i.e. particular process components) and if the requests originate directly from Java® or Flash® process components and/or indirectly from Java or Flash process components from descendants thereof.

As shown in FIG. 5C, requests to instantiate trusted exploitable Type B new process components 120B are denied (for example, blocked) if the requests originate directly from browsers and/or indirectly from browsers from descendants thereof (i.e. particular process components).

Figure 6A:
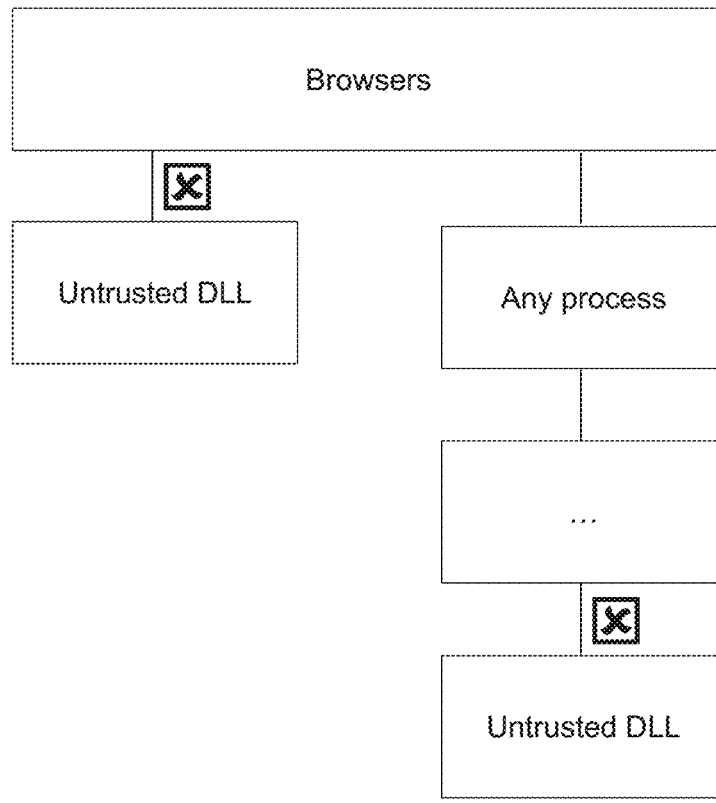
FIGS. 6A-6C are flowcharts of an example method of operating the computer device.
Figure 6B:
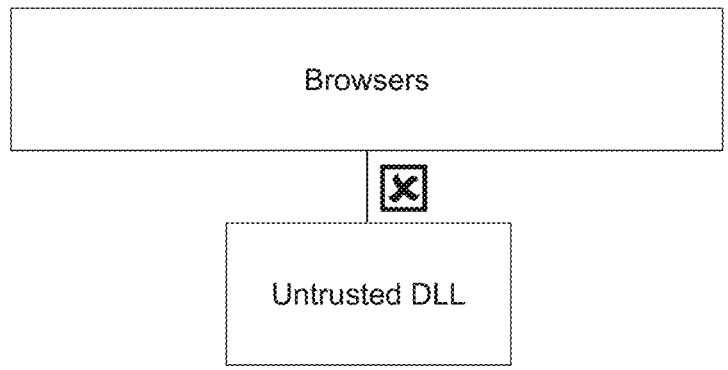
Figure 6C:
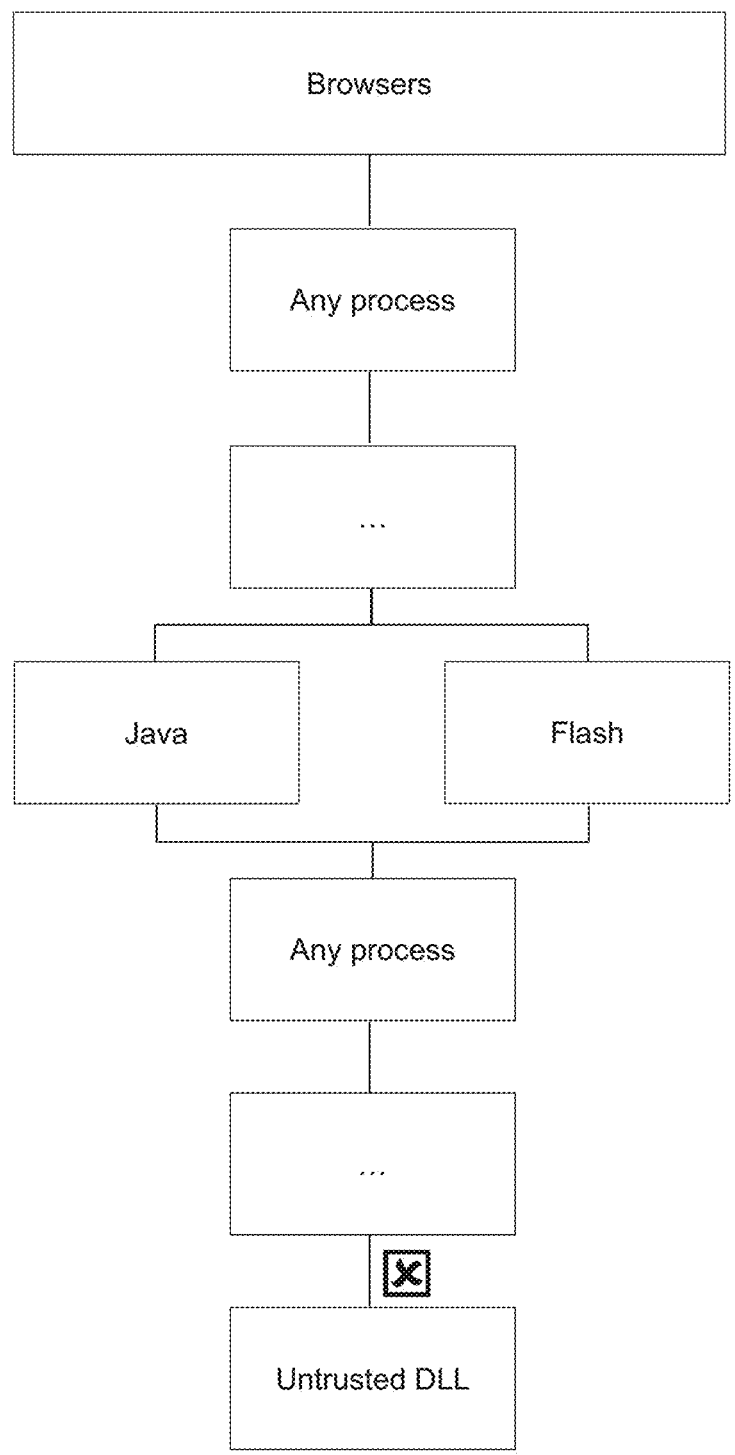

FIGS. 6A-6C are flowcharts of an example method of operating the computer device 100, under Microsoft Window. Particularly, FIGS. 6A-6C schematically illustrate examples of denying (for example, blocking) requests to load untrusted DLLs (i.e. instantiate new process components 120B, particularly new in-process components 120B), the requests originating directly from browsers and/or indirectly from browsers from descendants (for example, children) thereof (i.e. particular process components).

As shown in FIG. 6A, requests to load untrusted DLLs (i.e. instantiate new process components 120B) are denied (for example, blocked) if the requests originate directly from browsers and/or indirectly from browsers from descendants thereof (i.e. particular process components). Alternatively, requests to load untrusted DLLs (i.e. instantiate new process components 120B) may be permitted if the requests originate indirectly from browsers from descendants thereof (i.e. particular process components).

As shown in FIG. 6C, requests to load untrusted DLLs (i.e. instantiate new process components 120B) are denied (for example, blocked) if the requests originate directly from browsers and/or indirectly from browsers from descendants thereof (i.e. particular process components) and if the requests originate directly from Java or Flash process components and/or indirectly from Java or Flash process components from descendants thereof.

Figure 7A:
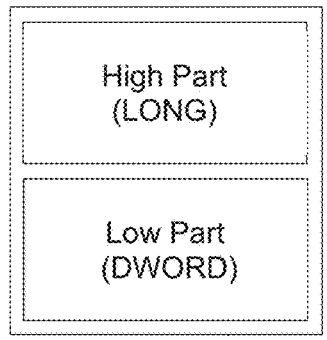
FIGS. 7A-7B are examples of identifiers.
Figure 7B:
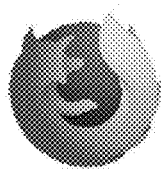
Figure 7B:
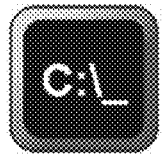
Figure 7B:
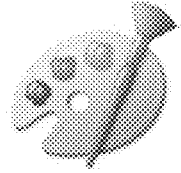
Figure 7B:
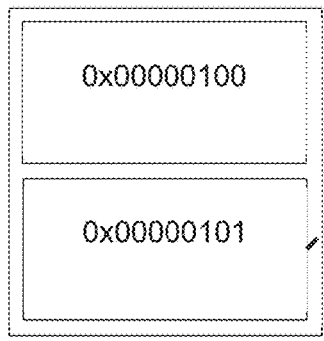
Figure 7B:
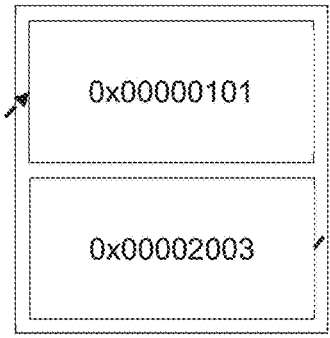
Figure 7B:
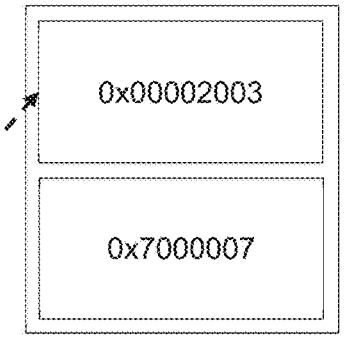

FIGS. 7A-7B are examples of identifiers, under Microsoft Windows.

FIG. 7A shows a source identifier SourceIdentifier of a Windows token, including a high part (LONG) and a low part (DWORD).

FIG. 7B shows source identifiers for three Windows tokens for launching of child processes, according to an example.

At S701, Mozilla Firefox (i.e. a process component) is initially launched, for example from the desktop, by the logged in user. Hence, Mozilla Firefox has neither a parent process component nor a grandparent process component. The token for Mozilla Firefox has a default high part 0x00000100 and a generated low part 0x00000101.

At S702, a command window (i.e. a process component) is launched from Mozilla Firefox. Hence, the command window is a child of Mozilla Firefox (i.e. a parent process component) but does not have a grandparent process component. The token for the command window has a high part 0x00000101, being the low part for Mozilla Firefox, and a generated low part 0x00002003.

At S703, MS Paint (i.e. a process component) is launched from the command window. Hence, MS Paint is a child of the command window (i.e. a parent process component) and a grandchild of Mozilla Firefox (i.e. a grandparent process component). The token for MS Paint has a high part 0x00002003, being the low part for the command window, and a generated low part 0x07000007. In this way, process component parents may be tracked.

Figure 8:
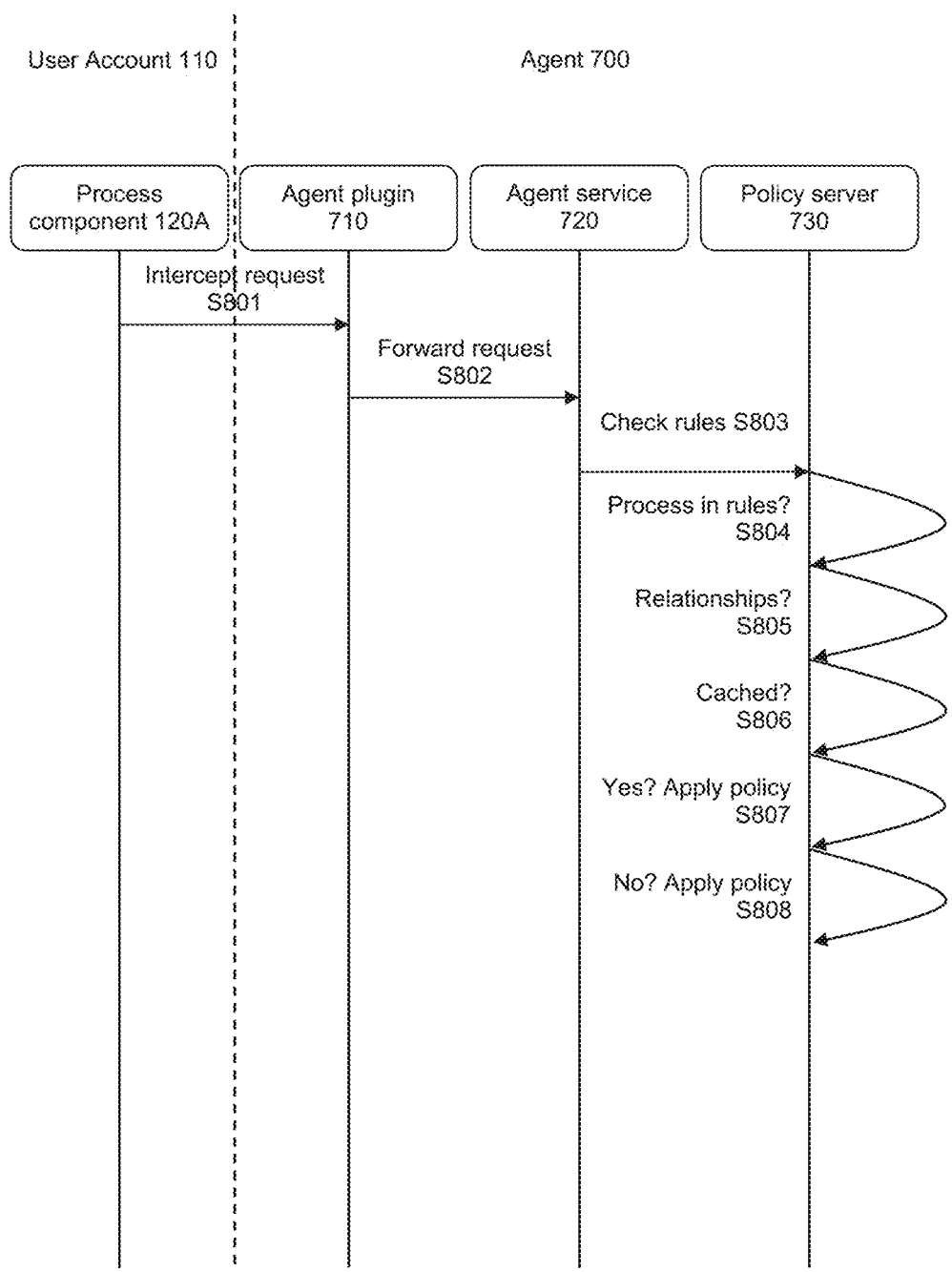
FIG. 8 is a flowchart of an example method of operating the computer device.
Figure 9:
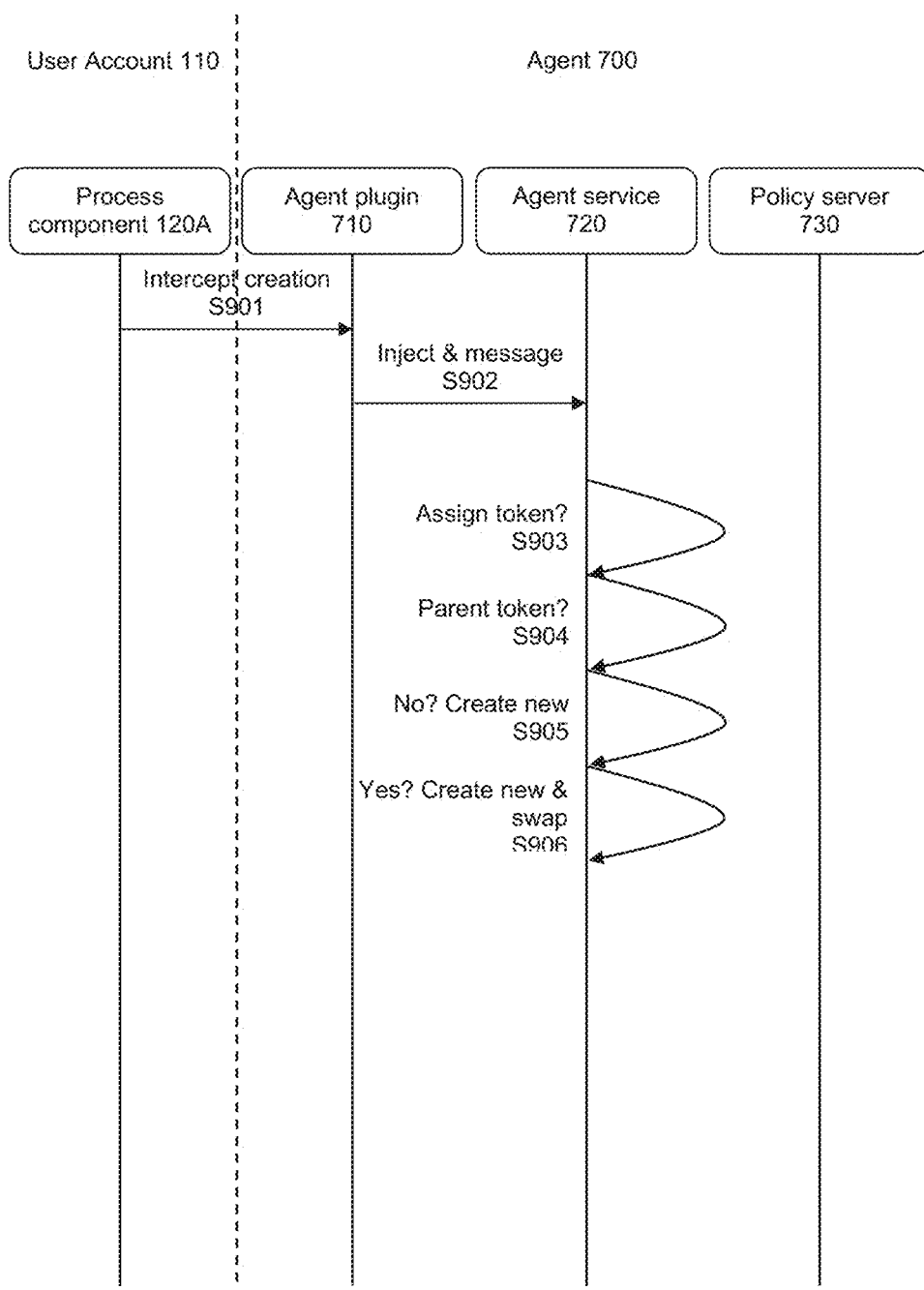
FIG. 9 is a flowchart of an example method of operating the computer device.

FIG. 8 and FIG. 9 are flowcharts of an example method of operating the computer device. Particularly, FIG. 8 shows a flowchart for a first part of the example method, in which a request to instantiate a new process component 120B is intercepted. Particularly, FIG. 9 shows a flowchart for a second part of the example method, in which instantiation of the new process component 120B is intercepted and an identifier 130B inserted therein. For insertion of the identifier 130B, the new process component 120B is suspended before and resumed after.

In this example, the agent 700 includes an agent plugin 710, an agent service 720 and a policy server 730, as described previously. More or fewer components may be provided for the agent 700.

At S801, the agent plugin 710 intercepts a request to instantiate a new process component 120B in a user account 110 of a logged-in user, wherein the request originates from an instance of a particular process component 120A amongst a set of process components 120 and wherein the user account has assigned thereto default user privileges by a privilege access management service 103 cooperating with an operating system 102 of the computer device 100. In this example, the agent plugin 710 intercepts a function CreateProcess.

At S802, the agent plugin 710 forwards the request to the agent service 720.

At S803, the agent service 730 checks the policy server 730 (i.e. a rules engine).

At S804, the policy server 730 checks if the new process component 120B is included in the rules.

At S805, if the new process component 120B is included in the rules, the policy server 730 checks if a relevant rule states or infers that parent-child relationships are of interest (i.e. relevant).

At S806, if the rule states or infers that parent-child relationships are of interest, the policy server 730 checks if there are any process components 120 included in the set 702 of identifier information related to the relevant rule.

At S807, if there are any process components 120 included in the set 702 of identifier information related to the relevant rule, the policy server applies (i.e. actions) the relevant rule to the new process component 120B.

At S807, if there are no process components 120 included in the set 702 of identifier information related to the relevant rule, the method ends.

At S901, the new process component 120B is instantiated. Microsoft functions CreateProcessInternalW, CreateProcessAsUserW and/or ShellExecuteExW are hooked to determine when the new process component 120B is being launched.

At S902, the agent plugin 710 injects a hook into the instantiated new process component 120B and messages the agent service 720 that the new process component 120B has been instantiated. Running of the instantiated new process component 120B is paused. Particularly, a flag CREATE_SUSPENDED is set by the agent 700 during creation of the new process component 120B. In this way, the instantiated new process component 120B is paused (i.e. suspended), thereby allowing exchanging of a default token (i.e. an existing token) of the instantiated new process component with a new token 130B, as described below.

At S903, the agent service 720 checks the relevant rule that has been applied to the new process component 120B by the policy server 720. If the relevant rule states that a token 130 must be inserted into the new process component 120B, the method moves to S904. Otherwise, the method ends.

At S904, the agent service 720 checks if the parent process component 120A (i.e. the particular process component 120A) has a respective token 130A (i.e. an identifier 130A).

At S905, if the parent process component 120A (i.e. the particular process component 120A) does not have a respective token 130A, the agent service 720 generates a LUID 131B (i.e. a unique identifier 131B) for the new process component 120B and inserts a token 130B, comprising the unique identifier 131B, as the low part, into the new process component 120B by exchanging a default token (i.e. an existing token) of the instantiated new process component with the token 130B.

At S906, if the parent process component 120A (i.e. the particular process component 120A) does have a respective token 130A, the agent service 720 generates a LUID 131B (i.e. a unique identifier 131B) for the new process component 120B and inserts a token 130B, comprising the unique identifier 131B, as the low part, and the low part of the respective token 130A of the parent process component 120A, as the high part, into the new process component 120B by exchanging a default token (i.e. an existing token) of the instantiated new process component 120B with the token 130B. Running of the instantiated new process component 120B is resumed, by using the ResumeThread API, which allows the new process component 120B to continue running as normal but with the token 130B, instead of the default token.

Optionally, the agent 700, for example the agent service 720, stores the store information related to the identifier 130B in a set 702 of identifier information.

The example embodiments have many benefits and advantages, as will now be appreciated from the discussion herein. In particular, instantiation of new process components may be controlled, reducing security vulnerabilities that, for example, untrusted new process components may exploit by inheriting the default user privileges from the originating particular process components.

In summary, there is described an improved computer device and method for controlling process components on the computer device. Particularly, by intercepting requests to instantiate new process components in a user account of a logged-in user, wherein the requests originate from instance of particular process components amongst sets of process components and wherein the user account has assigned thereto default user privileges by the privilege access management service and determining whether to permit the intercepted requests including by: validating relationships between the new process components and the particular process components; and establishing sets of identified owners by identifying owners of the new process components, the particular process components and any parents thereof; the intercepted requests may be permitted if the relationship are validated and if trusted owners are identified amongst the sets of identified owners. Furthermore, identifiers are inserted into the instantiated new process components, thereby improving robustness of identifying the trusted owners, even if the process components directly having trusted owners have been terminated or if the requests originate only indirectly from the process components having the trusted owners. In this way, instantiation of new process components may be controlled, reducing security vulnerabilities that, for example, untrusted new process components may exploit by inheriting the default user privileges from the originating particular process components.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A system, comprising:
a memory; and
a computing device in communication with the memory, the computing device configured to execute an agent that, when executed by the computing device, causes the computing device to:
intercept a request to instantiate a new process component in a user account of a logged-in user, wherein the request originates on the computing device from an instance of a particular process component of a set of process components executed by the computer device and wherein a privilege access management service has assigned default user privileges to the user account;
determine whether to permit the intercepted request including by:
validating a relationship between the new process component and the particular process component; and
establishing a set of identified owners by recursively identifying owners of the new process component, the particular process component, and any parents thereof; and
permit the intercepted request if the relationship is validated and if a trusted owner is identified amongst the set of identified owners.

2. The system of claim 1, wherein the agent further causes the computing device to intercept a request to instantiate a new out-of-process component comprising creating a new instance of an executable application.

3. The system of claim 1, wherein the agent further causes the computing device to identify an identity of the particular process component from the intercepted request and an identity of the new process component from the intercepted request.

4. The system of claim 1, wherein the agent further causes the computing device to validate the relationship between the new process component and the particular process component by consulting a plurality of rules stored on the computer device.

5. The system of claim 4, wherein the plurality of rules include mappings between process components.

6. The system of claim 1, wherein the agent further causes the computing device to:
establish an authorization for the logged-in user to permit the intercepted request; and
permit the intercepted request if the authorization is established.

7. The system of claim 6, wherein the agent further causes the computing device to
provide a graphical user interface (GUI) dialog comprising at least one of: a confirmation, a challenge-response, and a reason; and
receive a response therefrom.

8. The system of claim 1, wherein the agent further causes the computing device to deny the intercepted request if the relationship is not validated or if the trusted owner is not identified amongst the set of identified owners.

9. The system of claim 8, wherein the agent further causes the computing device validate the relationship by verifying against data comprising a mapping between the particular process component and the new process component.

10. A method, comprising:
intercepting, by an agent executed by a computer device, a request to instantiate a new process component in a user account of a logged-in user, wherein the request originates on the computing device from an instance of a particular process component amongst a set of process components executed by the computer device and wherein the user account has assigned thereto default user privileges by a privilege access management service cooperating with an operating system of the computer device;

determining, by the agent, whether to permit the intercepted request including: validating a relationship between the new process component and the particular process component;

establishing a set of identified owners by recursively identifying owners of the new process component, the particular process component and any parents thereof, and permitting, by the agent, the intercepted request if the relationship is validated and if a trusted owner is identified amongst the set of identified owners.

11. The method of claim 10, wherein intercepting the request comprises intercepting a request to instantiate a new in-process component comprising loading a shared library.

12. The method of claim 10, wherein intercepting the request comprises intercepting a request to instantiate a new out-of-process component comprising creating a new instance of an executable application.

13. The method of claim 10, further comprising identifying an identity of the particular process component from the intercepted request and an identity of the new process component from the intercepted request.

14. The method of claim 10, wherein validating the relationship between the new process component and the particular process component comprises consulting a plurality of rules stored on the computer device.

15. The method of claim 14, wherein the plurality of rules comprise at least one mapping between two or more process components from at least one trusted process component and at least one untrusted process component.

16. The method of claim 10, further comprising denying, by the agent, the intercepted request if the relationship is not validated and if the trusted owner is not identified amongst the set of identified owners.

17. The method of claim 16, further comprising notifying the logged-in user, by the agent, if the intercepted request is denied.

18. A non-transitory computer-readable medium embodying a program that, when executed by a computing device, causes the computing device to:

intercept a request to instantiate a new process component in a user account of a logged-in user, wherein the request originates on the computing device from an instance of a particular process component amongst a set of process components executed by the computer device and wherein the user account has assigned thereto default user privileges by a privilege access management service;

determine whether to permit the intercepted request including by:

validating a relationship between the new process component and the particular process component; and establishing a set of identified owners by recursively identifying owners of the new process component, the particular process component and any parents thereof, and permit the intercepted request if the relationship is validated and if a trusted owner is identified amongst the set of identified owners.

19. The non-transitory computer-readable medium of claim 18, wherein the program further causes the computing device to:

establish authorization from the logged-in user to permit the intercepted request; and permit the intercepted request if the authorization is established.

20. The non-transitory computer-readable medium of claim 18, wherein the program further causes the computing device to:

provide a graphical user interface (GUI) dialog comprising at least one of: a confirmation, a challenge-response, and a reason; and receive a response via the GUI dialog.

* * * * *